United States Patent
Kim et al.

(10) Patent No.: US 7,319,707 B2
(45) Date of Patent: Jan. 15, 2008

(54) L-BAND LIGHT SOURCE

(75) Inventors: Sang-Ho Kim, Suwon-si (KR);
Seong-Taek Hwang, Pyeongtaek-si (KR); Kwan-Woong Song, Seongnam-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 202 days.

(21) Appl. No.: 10/901,281

(22) Filed: Jul. 28, 2004

(65) Prior Publication Data

US 2005/0135438 A1    Jun. 23, 2005

(30) Foreign Application Priority Data

Dec. 19, 2003    (KR) .................. 10-2003-0093866

(51) Int. Cl.
*H01S 3/30* (2006.01)
*H01S 3/08* (2006.01)

(52) U.S. Cl. ............... 372/6; 372/92; 372/99

(58) Field of Classification Search ............ 372/70, 372/6
See application file for complete search history.

(56) References Cited

U.S. PATENT DOCUMENTS

| | | | |
|---|---|---|---|
| 6,621,627 B2 * | 9/2003 | Willner et al. ............ 359/349 |
| 6,631,025 B2 * | 10/2003 | Islam et al. ............ 359/334 |
| 6,781,748 B2 * | 8/2004 | Yeniay ............ 359/341.1 |
| 6,876,489 B2 * | 4/2005 | Islam et al. ............ 359/334 |
| 6,919,986 B2 * | 7/2005 | Islam ............ 359/334 |
| 6,975,450 B2 * | 12/2005 | Hwang et al. ............ 359/349 |
| 6,985,283 B1 * | 1/2006 | Islam et al. ............ 359/334 |
| 7,019,892 B2 * | 3/2006 | Hwang et al. ............ 359/333 |
| 7,038,840 B1 * | 5/2006 | Yam ............ 359/334 |
| 2004/0240045 A1 * | 12/2004 | Lee et al. ............ 359/349 |
| 2005/0099675 A1 * | 5/2005 | Lee et al. ............ 359/341.3 |

FOREIGN PATENT DOCUMENTS

JP    11-307855    11/1999

OTHER PUBLICATIONS

Tsai et al, High pumping-efficiency l-band erbium doped fiber ASE source using double-pass bidirectional-pumping configuration, Feb. 2003, IEEE Photonics Technology Letters, vol. 15, No. 2, pp. 197-199.*

Tsai, Szu-Chi et al.; "High Pumping-Efficiency L-Band Erbium Doped Fiber ASE Source Using Double-Pass Bidirectional-Pumping Configuration;" IEEE Photonics Technology Letters vol. 15, No. 2; Feb. 2003; 3 pgs.

* cited by examiner

*Primary Examiner*—Armando Rodriguez
(74) *Attorney, Agent, or Firm*—Cha & Reiter, LLC

(57) ABSTRACT

An L-band light source is provided that has improved amplifying efficiency and stabilized output power. The L-band light source comprises: a gain medium having first and second sides, and configured to generate an L-band amplified spontaneous emission (ASE); a first pump light source to generate first pumping light; a first wavelength selective coupler to supply the first pumping light to the gain medium; and a first reflector to reflect a part of ASE outputted to the fist side of the gain medium, the first reflector having a predetermined reflection.

9 Claims, 4 Drawing Sheets

L-BAND LIGHT SOURCE

CLAIM OF PRIORITY

This application claims priority to an application entitled "L-Band Light Source with Improved Amplifying Efficiency and Stabilized Output Power," filed with the Korean Intellectual Property Office on Dec. 19, 2003 and assigned Ser. No. 2003-93866, the contents of which are hereby incorporated by reference.

BACKGROUND OF THE INVENTION

1. Field of the Invention

The present invention relates to an optical module, in particular to an L-band light source.

2. Description of the Related Art

A light source with a wide wavelength band is needed to measure the optical characteristics employed in optical communication. Moreover, the wavelength band of the optical signals used in optical communication is 1520 nm~1620 nm when at least one erbium doped fiber amplifier (EDFA) is employed. Thus, a light source capable of measuring optical characteristics of various optical components within such a wavelength band is needed.

A wavelength division multiplexing passive optical network (WDM-PON) has recently been highlighted as a technology for a high-speed fiber-to-the-home (FTTH) network. In a WDM-PON attention is paid to the broadband light source that is used along with a wavelength locked Fabry Perot laser diode (FP-LD) in order to accommodate a plurality of subscribers. Existing available broadband light sources mainly employ a white light source or an EDFA outputting amplified spontaneous emission (ASE). However, because white light sources have low output power, they are limited in measuring the optical characteristics of a light source or an optical component for a WDM-PON which requires high output power. In addition, EDFAs are not economical in price.

U.S. Pat. No. 6,507,429 issued to Gaelle Ales et al. and entitled "Article Comprising a High Power/Broad Spectrum Superfluorescent Fiber Radiation Source" discloses a broadband source for outputting C-band (1520 nm~1570 nm) ASE and L-band (1570 nm~1620 nm) ASE. The broadband light source includes first and second rare earth element doped optical fibers, and an isolator located between the optical fibers. First pumping light from a first pump light source is supplied to the first rare earth element doped optical fiber and second pumping light from second pump light source is supplied to the second rare earth element doped optical fiber. The first rare earth element doped optical fiber has a length longer than that of the second rare earth element doped optical fiber about five times. A reflector reflects ASE inputted from the first rare earth element doped optical fiber, thus assisting generation of L-band ASE in the first rare earth element doped optical fiber. The second rare earth element doped optical fiber conducts functions of amplifying the L-band ASE and generating C-band ASE. As a result, the broadband light source is able to output C-band and L-band ASEs through an output end thereof.

However, the typical broadband optical source has poor output efficiency. This is due to the isolator being between the first and second rare earth element doped optical fibers; thus, the C-band ASE outputted to the rear side of the second rare earth element doped optical fiber cannot be used. In addition, if the output power of the first pump light source is changed so as to tune the output power of the L-band ASE (obtained from the first rare earth element doped optical fiber), not only the output power of the L-band ASE but also the output power of the C-band ASE is changed. In contrast, if the output power of the second pump light source is changed so as to tune the C-band ASE (obtained from the second rare earth element doped optical fiber), not only the output power of the C-band ASE, but also the output power of the L-band ASE is changed. Accordingly, since the output powers of the C-band ASE and L-band ASE are affected by one another, it is more difficult to control the output power of the broadband light source.

SUMMARY OF THE INVENTION

Accordingly, the present invention has been made to reduce or overcome the above-mentioned problems occurring in the prior art. One object of the present invention is to provide an L-band light source having improved amplifying efficiency and stabilized output power. Thus, the L-band light source is suitable for measuring the characteristics of an optical component or use as a broadband light source for a WDM-PON.

In accordance with the principles of the present invention, an L-band light source is provided and includes: a gain medium having first and second sides, and configured to generate an L-band amplified spontaneous emission (ASE); a first pump light source to generate first pumping light; a first wavelength selective coupler to supply the first pumping light to the gain medium; and a first reflector to reflect a part of ASE outputted to the fist side of the gain medium, the first reflector having a predetermined reflection wavelength included in C-band.

BRIEF DESCRIPTION OF THE DRAWINGS

The present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configurations incorporated herein will be omitted as it may make the subject matter of the present invention unclear.

Figure 1:
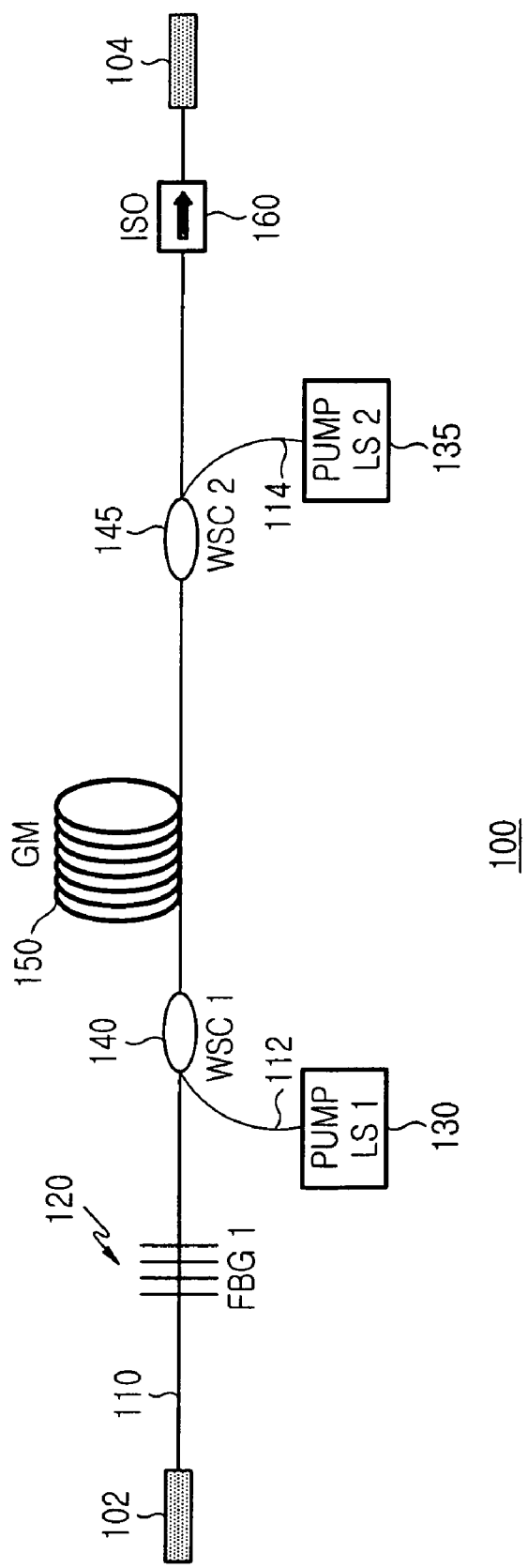
FIG. 1 shows a construction of an L-band light source according to a first embodiment of the present invention.

FIG. 1 shows a construction of an L-band light source according to a first embodiment of the present invention. The L-band light source 100 comprises a fiber Bragg grating (FBG) 120, first and second pump light sources 130, 135, first and second wavelength selective couplers (WSCs) 140, 145, a gain medium 150, and an isolator (ISO) 160. The fiber Bragg grating 120, the gain medium 150, the first and second wavelength selective couplers 140, 145 and the isolator 160 are connected in series using a first optical waveguide 110. The first pump light source 130 is connected in parallel to the gain medium 150 using a second optical waveguide 112 and the second pump light source 135 is connected in parallel to the gain medium 150 using a third optical waveguide 114.

The first pump light source 130 outputs first pumping light, and the first and second pump light sources 130, 145 may each incorporate a laser diode outputting light having a wavelength of 980 nm or 1480 nm.

The first wavelength selective coupler 140 is located between the fiber Bragg grating 120 and the gain medium 150. The first wavelength selective coupler 140 supplies pumping light to the gain medium 150.

The second pump light source 125 outputs second pumping light. The second wavelength selective coupler 145 is located between the gain medium 150 and the isolator 160. The second wavelength selective coupler 145 supplies the second pumping light to the gain medium 150.

The gain medium 150 is located between the first and second wavelength selective couplers 140, 145 and has a length suitable for generating L-band ASE. The gain medium 150 is controlled to have a relatively long length. Thus, it generates ASE in a wavelength band of 1520 nm~1620 nm. In addition, the C-band (1520 nm~1570 nm) ASE in the generated ASE is absorbed while progressing within the gain medium 150. As a result, the gain medium 150 serves to amplify the L-band (1570 nm~ASE 1620 nm) with a lower output power generated at the end of the gain medium 150. For example, the gain medium 150 may incorporate an EDF having a length of about 50 m. The gain medium 150 outputs ASE to a first and second side, hereinafter, front and rear sides, thereof as it is pumped by the first and second pumping light. The ASE outputted to the front side of the gain medium 150 passes the second wavelength selective coupler 145 and the isolator 160. Then the ASE is outputted to the outside through the output end 104 of the L-band light source 100. The ASE outputted to the rear side of the gain medium 150 passes the first wavelength selective coupler 140. Then, the ASE is inputted into the fiber Bragg grating 120.

The fiber Bragg grating 120 is located between a terminal end 102 of the L-band light source 100 and the first wavelength selective coupler 140. The fiber Bragg grating 120 has a predetermined reflection wavelength and reflects a part of the inputted rear side ASE to the gain medium 150. The rear side ASE reflected from the fiber Bragg grating 120 passes the first wavelength selective coupler 140. Then, the rear side ASE is inputted into the gain medium 150, thus pumping the gain medium 150. The ASE having passed the fiber Bragg grating 120 is inputted into the terminal end of the L-band light source 100 and disappears. The fiber Bragg grating 120 may have a reflection wavelength of 1560 nm.

In order to prevent the rear side ASE reflected from the terminal end 102 of the broadband light source 100 from being inputted into the first wavelength selective coupler 140, an angled connector may be provided at the terminal end 102 of the broadband light source 100. Alternatively, an additional isolator may be installed between the terminal end 102 and the fiber Bragg grating 120. It is also possible to form a reflecting body which reflects about 4% of the rear side ASE. This can be accomplished by cutting an end surface of the first optical waveguide 110 vertically to the progressing direction of the rear side ASE, whereby the reflected C-band ASE can improve the output power of the L-band ASE.

The isolator 160 is located between the gain medium 150 and the output end 104 of the broadband light source 100. The isolator 160 passes the front side ASE inputted from the gain medium 150 and blocks light progressing in the opposite direction.

Figure 4:
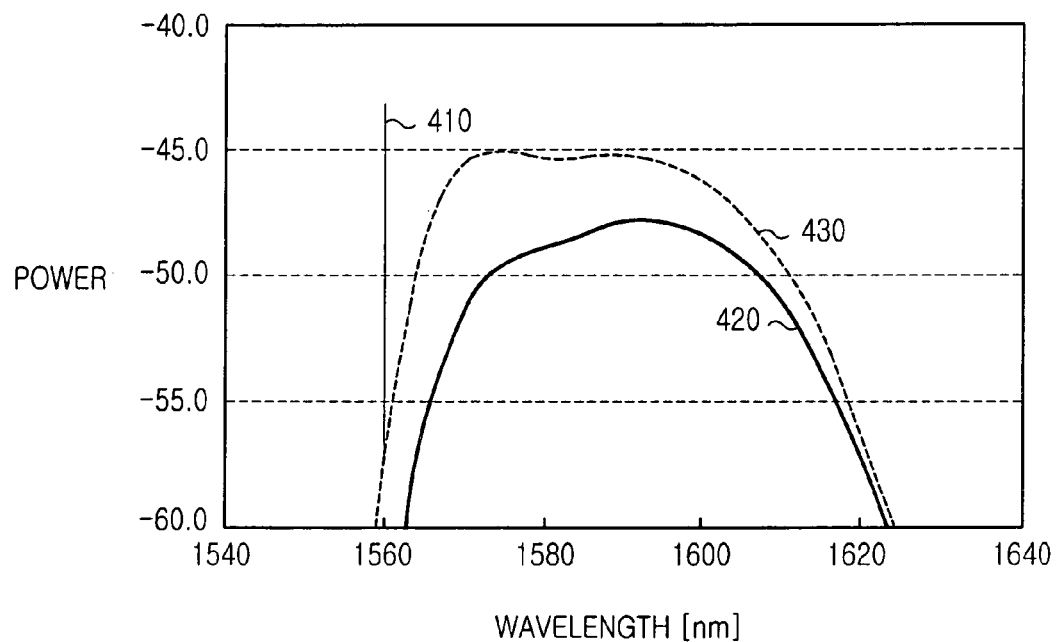
FIG. 4 is a view for illustrating characteristics of output power of the broadband light source shown in FIG. 1.

FIG. 4 is a view for illustrating output characteristics of the broadband light source shown in FIG. 1. FIG. 4 shows output spectrum 430 of the broadband light source 100 and output spectrum 430 obtained after removing the fiber Bragg grating 120 from the broadband light source 100. The fiber Bragg grating 120 has a wavelength of 1560 nm, and the reflected spectrum 410 of the fiber Bragg grating 120 is shown in the drawing. It can be seen that the L-band ASE is efficiently amplified after the gain medium 150 is pumped with reflected light having a wavelength of 1560 nm. At this time, the amplified intensity of L-band ASE may be varied depending on the power of the reflected light. If the power of the reflected light is too high, the reflected light takes the energy of the L-band ASE and the reflected light may be amplified whereas the power of the L-band ASE may decrease. As a result, the gain medium 150 may be placed in a saturated condition in a predetermined power range.

Figure 2:
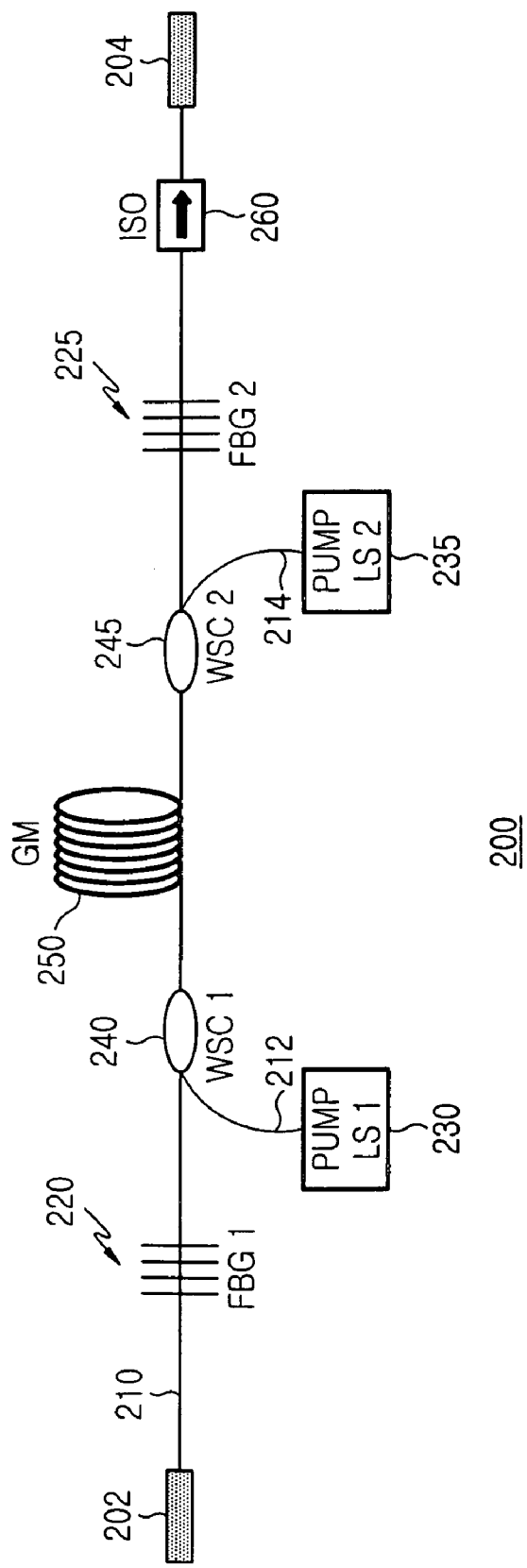
FIG. 2 shows a construction of an L-band light source according to a second embodiment of the present invention.

FIG. 2 shows a construction of an L-band light source according to a second embodiment of the present invention. The L-band light source 200 comprises first and second fiber Bragg gratings 220, 225, first and second pump light sources 230, 235, first and second wavelength selective couplers 240, 245, a gain medium 250, and an isolator 260.

The first pump light source 230 outputs first pumping light. The first wavelength selective coupler 240 is located between the first fiber Bragg grating 220 and the gain medium 250. The first wavelength selective coupler 240 supplies the first pumping light to the gain medium 250.

The second pump light source 235 outputs second pumping light. The second wavelength selective coupler 245 is located between the gain medium 250 and the second fiber Bragg grating 225. The second wavelength selective coupler 245 supplies the second pumping light to the gain medium 250.

The gain medium 250 is located between the first and second wavelength selective couplers 240, 245 and has a length suitable for generating L-band ASE. The gain medium 250 outputs ASE to the front and rear sides thereof as it is pumped by the first and second pumping light. The ASE outputted to the front side of the gain medium 250 passes the second wavelength selective coupler 245. Then, the ASE is inputted into the second fiber Bragg grating 225. The ASE outputted to the rear side of the gain medium 250 passes the first wavelength selective coupler 240. Then, the ASE is inputted into the first fiber Bragg grating 220.

The first fiber Bragg grating 220 is located between a terminal end 202 of the L-band light source 200 and the first wavelength selective coupler 140. The first fiber Bragg grating 220 has a predetermined reflection wavelength and reflects a part of the inputted rear side ASE toward the gain medium 250. The rear side ASE reflected from the first fiber Bragg grating 220 passes the first wavelength selective coupler 240. Then, the rear side ASE is inputted into the gain medium 250, thus pumping the gain medium 250. The rear side ASE having passed the first fiber Bragg grating 220 is inputted into the terminal end 202 of the L-band light source 200 and disappears. The first fiber Bragg grating 220 may have a reflection wavelength of 1560 nm.

The second fiber Bragg grating 225 is located between the second wavelength selective coupler 245 and the isolator 160 and has a predetermined reflection wavelength included in the C-band. The second fiber Bragg grating 225 reflects a part of the inputted front side ASE toward the gain medium 250. The front side ASE reflected from the second fiber Bragg grating 225 passes the second wavelength selective coupler 245. Then the front side ASE is inputted into the gain medium 250, thus pumping the gain medium 250. The ASE having passed the second fiber Bragg grating 225 passes the isolator 260 and then the ASE is outputted to the outside through the output end 204 of the L-band light source 200. The second fiber Bragg grating 225 may have a wavelength of 1550 nm. If the reflection wavelengths of the first and second fiber Bragg gratings 220, 225 are the same as one another and the reflected ASEs are not sufficiently absorbed within the gain medium 250, they may form a resonance structure and cause oscillation. Therefore, it is possible to make the first and second fiber Bragg gratings 220, 225 have different wavelengths.

The isolator 260 is located between the second fiber Bragg grating 225 and the output end 204 of the broadband light source 200. The isolator 260 passes the front side ASE having passed the second fiber Bragg grating 225 and blocks light progressing in the opposite direction.

Figure 3:
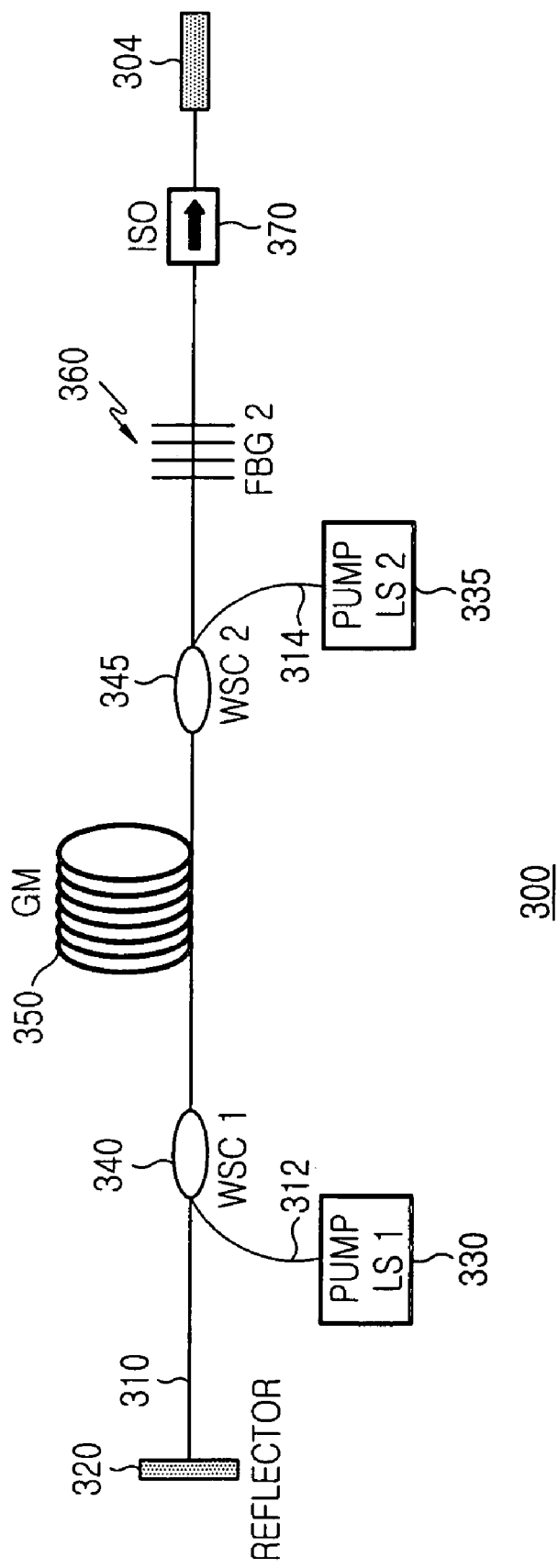
FIG. 3 shows a construction of an L-band light source according to a third embodiment of the present invention.

FIG. 3 shows a construction of an L-band light source according to a third embodiment of the present invention. The L-band light source 300 comprises a reflector 320, a fiber Bragg grating 360, first and second pump light sources 330, 335, first and second wavelength selective couplers 340, 345, a gain medium 350, and an isolator 370.

The first pump light source 330 outputs first pumping light. The first wavelength selective coupler 340 is located between the reflector 320 and the gain medium 350. The first wavelength selective coupler 340 supplies the first pumping light to the gain medium 350.

The second pump light source 335 outputs second pumping light. The second wavelength selective coupler 345 is located between the gain medium 350 and the fiber Bragg grating 360. The second wavelength selective coupler 345 supplies the second pumping light to the gain medium 350.

The gain medium 350 is located between the first and second wavelength selective couplers 340, 345 and has a length suitable for generating L-band ASE. The gain medium 350 outputs the ASE to the front and rear sides thereof as it is pumped by the first and second pumping light. The ASE outputted to the front side of the gain medium 350 passes the second wavelength selective coupler 345. Then, the ASE is inputted into the fiber Bragg grating 360. The ASE outputted to the rear side of the gain medium 350 passes the first wavelength selective coupler 340. Then, the ASE is inputted into the fiber Bragg grating 360.

The reflector 320 is provided at a terminal end of the L-band light source 300. The reflector 320 reflects the inputted rear side ASE toward the gain medium 350. The ASE reflected from the reflector 320 passes the first wavelength selective coupler 340. Then the ASE is inputted into the gain medium 350, thus pumping the gain medium 350.

The fiber Bragg grating 360 is located between the second wavelength selective coupler 345 and the isolator 370 and has a predetermined reflection wavelength included in C-band. The fiber Bragg grating 360 reflects a part of the inputted front side ASE toward the gain medium 350. The ASE reflected from the second fiber Bragg grating 360 passes the second wavelength selective coupler 345. Then, the front side ASE is inputted into the gain medium 350, thus pumping the gain medium 350. The ASE having passed the fiber Bragg grating 360 passes the isolator 370. Then, the ASE is outputted to the outside through the output end 304 of the L-band light source 300.

The isolator 370 located between the fiber Bragg grating 360 and the output end 304 of the broadband light source 300. The isolator 370 passes the front side ASE having passed the fiber Bragg grating 360 and blocks light progressing in the opposite direction.

Advantageously, an L-band light source according to the present invention reuses a part of ASE generated in a gain medium as pumping light by employing a fiber Bragg grating.

Accordingly, amplifying efficiency is increased and output power is stabilized. The present invention also enables fabrication of (1) an expanded broadband light source and (2) a light source for measuring an optical characteristic of an optical component, needed in a wavelength division multiplexing passive optical network to be developed in earnest in the future.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An L-band light source comprising:
   a gain medium having first and second sides, and configured to generate the L-band amplified spontaneous emission (ASE);
   a first pump light source configured to generate first pumping light;
   a first wavelength selective coupler configured to supply the first pumping light to the gain medium; and
   a first reflector configured to reflect a part of ASE outputted to the fist side of the gain medium, the first reflector having a predetermined reflection wavelength included in C-band,
   a terminal end arranged to receive another part of the ASE output that passes through said first reflector, said terminal end prevents reflection to about no more than 4% of the ASE ouput that passes through said first reflector;
   wherein the L-band light source does not receive an L-band optical signal from outside of the L-band light source.

2. The L-band light source as claimed in claim 1, further comprising:
   a second pump light source to generate second pumping light; and
   a second wavelength selective coupler to supply the second pumping light to the gain medium.

3. The L-band light source as claimed in claim 2, further comprising an isolator coupled between the second wavelength selective coupler and the output end of the L-band light source, the isolator passing the inputted ASE and blocking light progressing in the opposite direction.

4. The L-band light source as claimed in claim 1, further comprising a second reflector to reflect a part of the ASE outputted to the second side of the gain medium toward the gain medium, the second reflector having a predetermined reflection wavelength included in the C-band.

5. The L-band light source as claimed in claim 1, wherein the light source includes a laser diode outputting light having a wavelength of substantially 980 nm or 1480 nm.

6. The L-band light source as claimed in claim 1, wherein the gain medium includes an erbium doped fiber.

7. An L-band light source comprising:
   a gain medium having a predetermined length and configured to enable generation of L-band ASE, the gain medium outputting the generated ASE to a front and rear side;

a first pump light source configured to generate first pumping light;

a first wavelength selective coupler configured to supply the first pumping light to the gain medium;

a first reflector configured to reflect a portion of ASE outputted to the rear side of the gain medium toward the gain medium;

a terminal end arranged to receive another portion of the ASE output that passes through said first reflector, said terminal end prevents reflection to about no more than 4% of the ASE output that passes through said first reflector; and a second reflector configured to reflect a portion of the ASE outputted to the front side of the gain medium, the second reflector having a predetermined reflection wavelength included in C-band, wherein the L-band light source does not receive an L-band optical signal from outside of the L-band light source.

8. The L-band light source as claimed in claim 7, further comprising:

a second pump light source to generate second pumping light; and a second wavelength selective coupler to supply the second pumping light to the gain medium.

9. The L-band light source as claimed in claim 8, further comprising an isolator located between the second wavelength selective coupler and the output end of the L-band light source, the isolator passing the inputted ASE and blocking light progressing in the opposite direction.

* * * * *